(12) United States Patent
Jensen et al.

(10) Patent No.: US 8,045,672 B2
(45) Date of Patent: Oct. 25, 2011

(54) CORE SPRAY SPARGER T-BOX ATTACHMENT AND CLAMP AND METHOD FOR CLAMPING

(75) Inventors: Grant Clark Jensen, Morgan Hill, CA (US); Robert W. Whitling, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 11/559,564

(22) Filed: Nov. 14, 2006

(65) Prior Publication Data

US 2008/0112530 A1 May 15, 2008

(51) Int. Cl.
*G21C 1/04* (2006.01)
(52) U.S. Cl. .... 376/352; 376/204; 376/282; 285/133.11
(58) Field of Classification Search .................. 376/371, 376/352, 374, 282, 204; 29/723; 285/133.11, 285/133.3, 133.5
See application file for complete search history.

(56) References Cited

U.S. PATENT DOCUMENTS

| | | | |
|---|---|---|---|
| 4,721,330 A | 1/1988 | Woodhouse | |
| 5,511,919 A | 4/1996 | Scalise | |
| 5,737,380 A | 4/1998 | Deaver et al. | |
| 5,752,807 A | 5/1998 | Erbes | |
| 5,839,192 A * | 11/1998 | Weems et al. ............ | 29/890.031 |
| 5,947,529 A | 9/1999 | Jensen | |
| 6,131,962 A | 10/2000 | Jensen et al. | |
| 6,224,292 B1 * | 5/2001 | Akalin ............................ | 404/26 |
| 6,375,130 B1 | 4/2002 | Jensen et al. | |
| 6,456,682 B1 | 9/2002 | Jensen | |
| 6,477,872 B1 | 11/2002 | Denton, Jr. | |
| 6,604,449 B2 | 8/2003 | Niessen | |
| 2003/0043955 A1 | 3/2003 | Lazarus | |
| 2003/0085301 A1 | 5/2003 | Ganoza et al. | |
| 2003/0132272 A1 | 7/2003 | Parker et al. | |
| 2006/0082139 A1 * | 4/2006 | Jensen ......................... | 285/192 |

FOREIGN PATENT DOCUMENTS

| | | |
|---|---|---|
| EP | 1 241 680 | 9/2002 |
| ES | 2 232 084 | 5/2005 |

* cited by examiner

*Primary Examiner* — Johannes P Mondt
(74) *Attorney, Agent, or Firm* — Nixon & Vanderhye P.C.

(57) ABSTRACT

A core spray sparger T-box clamp for a sparger T-box in a shroud of a nuclear reactor pressure vessel, the sparger T-box clamp including: an anchor plate substantially aligned with a closed end of the T-box; a carrier plate slidably secured to an upper side the anchor plate and latched to the T-box; a saddle bracket secured to a lower side of the anchor plate and latched to the T-box, and a pair of clamp blocks on opposite sides of the anchor plate fixed to sparger pipes coupled to the T-box.

14 Claims, 10 Drawing Sheets

CORE SPRAY SPARGER T-BOX ATTACHMENT AND CLAMP AND METHOD FOR CLAMPING

BACKGROUND OF THE INVENTION

This invention relates generally to nuclear reactors and, more particularly, to assemblies and methods for reinforcing piping for coolant spray within reactor pressure vessel of such reactor.

A reactor pressure vessel (RPV) of a boiling water reactor (BWR) typically has a generally cylindrical shape and is closed at both ends, e.g., by a bottom head and a removable top head. A core shroud typically surrounds the core and is supported by a shroud support structure.

Boiling water reactors generally include piping for core spray cooling water. Core spray piping is used to deliver water from outside the RPV to core spray spargers inside the RPV. The core spray piping and spargers deliver coolant water to the reactor core.

The core spray cooling water is typically supplied to the reactor core region through a sparger T-box which penetrates the shroud wall. The distal end of the sparger T-box is internal to the shroud and is capped by a flat cover plate welded to the distal end of the sparger T-box. A piping tee is formed by the welded union of the sparger T-box, sparger T-box cover plate, and two sparger pipes.

The welded unions between the T-box, cover plate and sparger pipes are susceptible to cracking. There is a risk that the cracks in these welds may propagate by progressing circumferentially around the welded joint. If circumferential cracking occurs in the welded unions, unpredictable cooling water leakage may result.

Intergranular stress corrosion cracking (IGSCC) occurs in reactor components exposed to high temperature water, such as structural members, piping, fasteners, and welds. The reactor components are subject to a variety of stresses associated with differences in thermal expansion, the operating pressure needed for the containment of the reactor cooling water, and other stress sources such as residual stresses from welding, cold working and other inhomogeneous metal treatments. Water chemistry, welding, heat treatment and radiation can increase the susceptibility of metal in a component to IGSCC.

There is a long felt need for a method and means to reinforce welded joints. Reinforcement helps prevent separation of the welded piping joints. It would be desirable to provide a clamping system to provide structural integrity to the sparger T-box and hold the welded joints together in the event of weld failure.

BRIEF DESCRIPTION OF THE INVENTION

The core spray piping systems in operating BWRs are of welded construction. Welds in the spray piping are susceptible to IGSCC. A repair or reinforcement clamping device has been developed that structurally supports welded joints between the core spray sparger T-box, sparger piping, and T-box cover plate. A reinforcing clamp has been developed that structurally replaces or reinforces the cover plate weld and sparger pipe welds of the sparger T-box. The clamp attaches to the T-box without substantial modification of the T-box.

A core spray sparger T-box clamp for a sparger T-box in a shroud of a nuclear reactor pressure vessel, the sparger T-box clamp includes: an anchor plate substantially aligned with a closed end of the T-box; a carrier plate slidably secured to a first side of the anchor plate and engages the T-box; a saddle bracket is secured to second side of the anchor plate and engages with the T-box, wherein the second side of the anchor plate is opposite to the first side, and a pair of clamp blocks on opposite sides of the anchor plate attach to a respective sparger pipe welded to the T-box.

The core spray sparger T-box may be latched to the T-box clamp by a first location pin extending into the bottom of a sidewall of the T-box and extending from the saddle bracket and a second location pin extending from the carrier plate into the top of the T-box sidewall, wherein the first location pin is parallel to the second location pin. The first location pin and the second location pin may extend vertically. The carrier plate may further include a vertical tongue that slides into a slot in the anchor plate and the tongue is parallel to a location pin. The carrier plate may include a horizontal arm having an arched lower surface conforming to a cylindrical sidewall of the T-box and the lower surface extends from the sidewall to beyond the T-box.

The saddle bracket may include a horizontal arm having an arched upper surface conforming to a cylindrical sidewall of the T-box and a tongue extending across the horizontal arm adapted to fit into a groove in a lower edge of the anchor plate. The horizontal arm of the saddle bracket includes a vertical locating pin extending into the T-box to latch the saddle bracket to the T-box. The saddle bracket may be secured to the anchor plate by at least one cap screw extending through the tongue and into a threaded aperture in the anchor plate.

The anchor plate further includes at least one threaded aperture orthogonal to an end plate of the T-box and a bearing plate bolt(s) turned into each of the threaded apertures. A bearing plate is rotatably attached to the ends of the bearing plate bolt(s). Turning the bolts, extends the bearing plate from the anchor plate to abut the bearing plate against the cover plate of a T-box.

A core spray sparger T-box clamp has been developed for a sparger T-box in a shroud of a nuclear reactor pressure vessel, the sparger T-box clamp comprising: an anchor plate assembly including an anchor plate, a bearing plate bolt extending through the anchor plate and a bearing plate attached to a distal end of the bearing plate bolt, wherein the bearing plate abuts an cover plate of the T-box; a carrier plate slidably secured to a first side of the anchor plate and latched to the T-box by a locating pin, and a saddle bracket secured to a second side of the anchor plate, wherein the second side of the anchor plate is opposite to the first side, and said saddle bracket is latched to the T-box by a second location pin.

A method has been developed for attaching a core spray sparger T-box clamp for a sparger T-box in a shroud of a nuclear reactor pressure vessel, the method comprising: attaching a saddle bracket to the underside side of the anchor plate; securing an assembly of the saddle bracket and anchor plate to a bottom surface of the T-box, and attaching a carrier plate to the anchor plate by a carrier bolt and latching the carrier plate to an upper surface of the T-box. The method may further include slidably mounting clamp blocks to the sides of the anchor plate and bolting the clamp blocks to sparger pipes welded to the T-box.

DETAILED DESCRIPTION OF THE INVENTION

A core spray sparger T-box clamp assembly which attaches to a core spray sparger T-box and connecting sparger piping has been developed. The clamp assembly structurally replaces or reinforces welds that attach the T-box cover plate and sparger pipes to a sparger T-box.

Figure 1:
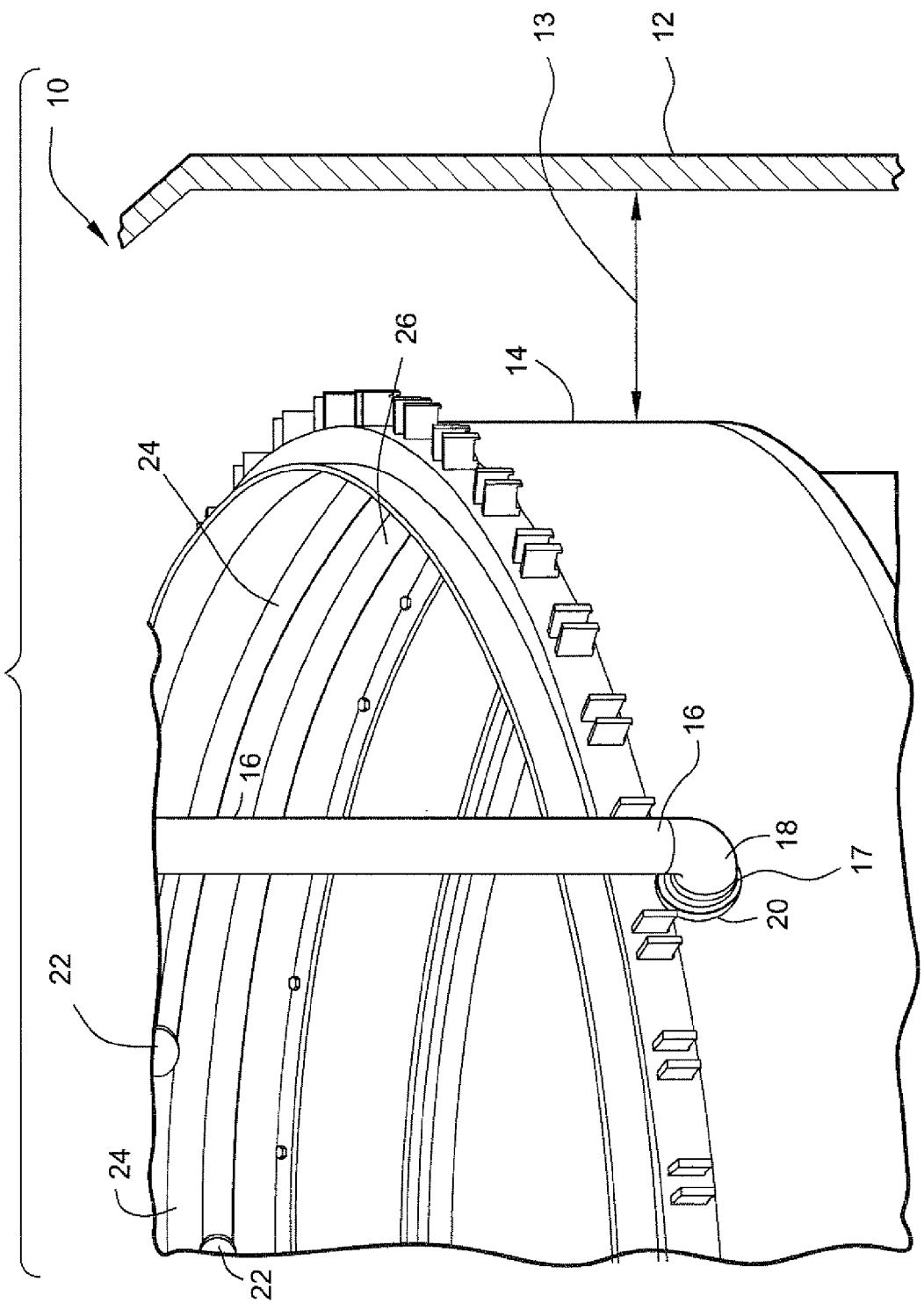
FIG. 1 is a perspective, partial cut away view of a reactor pressure vessel (RPV) of a boiling water nuclear reactor.

FIG. 1 is a partial cross-sectional and cut-away view of a reactor pressure vessel (RPV) of a boiling water nuclear reactor. FIG. 1 illustrates a shroud and shows the spatial arrangement of a downcomer piping, elbow and thermal sleeve 17 attachment to the shroud. A reactor pressure vessel (RPV) 10 includes a vessel wall 12 and a shroud 14 which surrounds the reactor core (not shown) of RPV 10. An annulus 13 may be formed between vessel wall 12 and shroud 14. The space within the annulus may be limited, as most reactor support piping may be located within the annulus.

When there is a loss of coolant to the RPV, cooling water is delivered to the reactor core through a core spray distribution header which includes a horizontal section (not shown) and a vertical section commonly referred to as a downcomer pipe 16. The downcomer pipe 16 may include a lower elbow 18 extending through a thermal sleeve 17 and passing through an aperture 20 (hidden by the thermal sleeve) in the wall of the shroud 14. A piping segment connects to the lower elbow, and extends through the shroud wall and to a sparger T-box 22 on the inside surface of the shroud wall. The T-box is attached to internal sparger pipes 24, 26, that extend circumferentially around the inside wall of the shroud 14.

Figure 2:
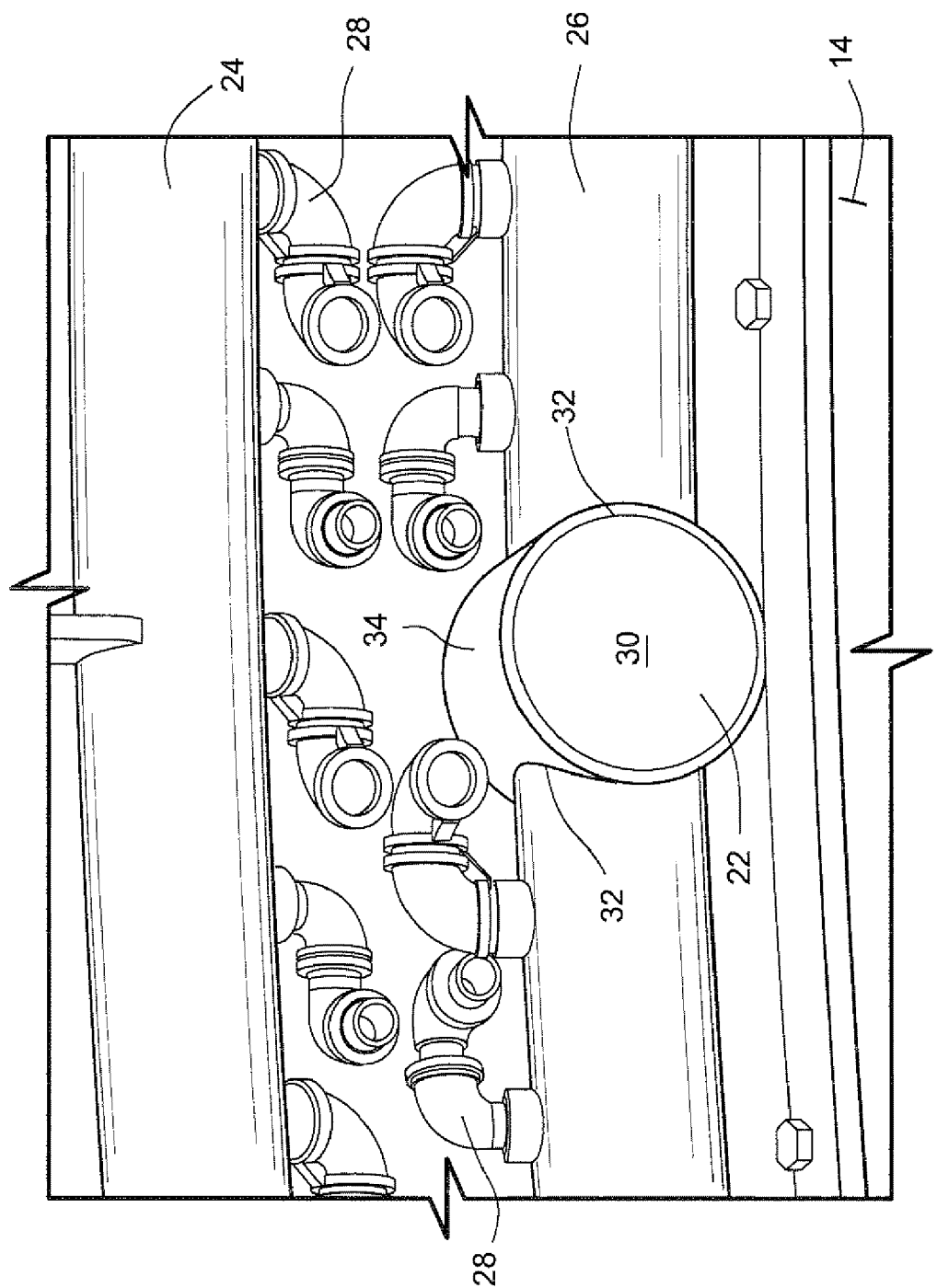
FIG. 2 is a perspective view of a portion of a T-box and sparger pipes viewed from the inside of the RPV.

FIG. 2 is perspective view of the inside wall of the shroud 14, the sparger T-box 22 and the sparger pipes 24, 26 that extend circumferentially around the shroud wall. A sparger T-box 22 provides cooling water to the core region through an opening 20 in the wall of the core shroud 14. The T-box 22 is welded to, for example, a cover plate 30 and to opposite ends of a sparger pipe 26, to which are connected conduits 28 that distribute the cooling water to the core region. A distal end of the sparger T-box is inside the shroud 14. The cover plate 30 is a flat plate welded to the distal end of the sparger T-box. The opposite ends of the sparger pipes 26 commonly of smaller bore than the T-box are welded to the sparger T-box 22. The sparger pipe 26 ends are welded 32 to openings provided in the sidewall 34 of the sparger T-box 22. A piping tee is formed by the welded union of the sparger T-box, sparger T-box cover plate, and the two segments of a sparger pipe.

The welded joints 32 between the T-box 22 and cover plate 30 and the T-box and sparger pipe 26 are susceptible to cracking. The weld cracking may propagate through the wall of the T-box or circumferentially around the cover plate or pipes. The cracking may lead to unpredictable leakage of coolant water from the T-box into the shroud. A preemptive repair and reinforcement clamp assembly has been developed to prevent separation of the welded joints, even if the cracking through the joints becomes excessive.

Figure 3:
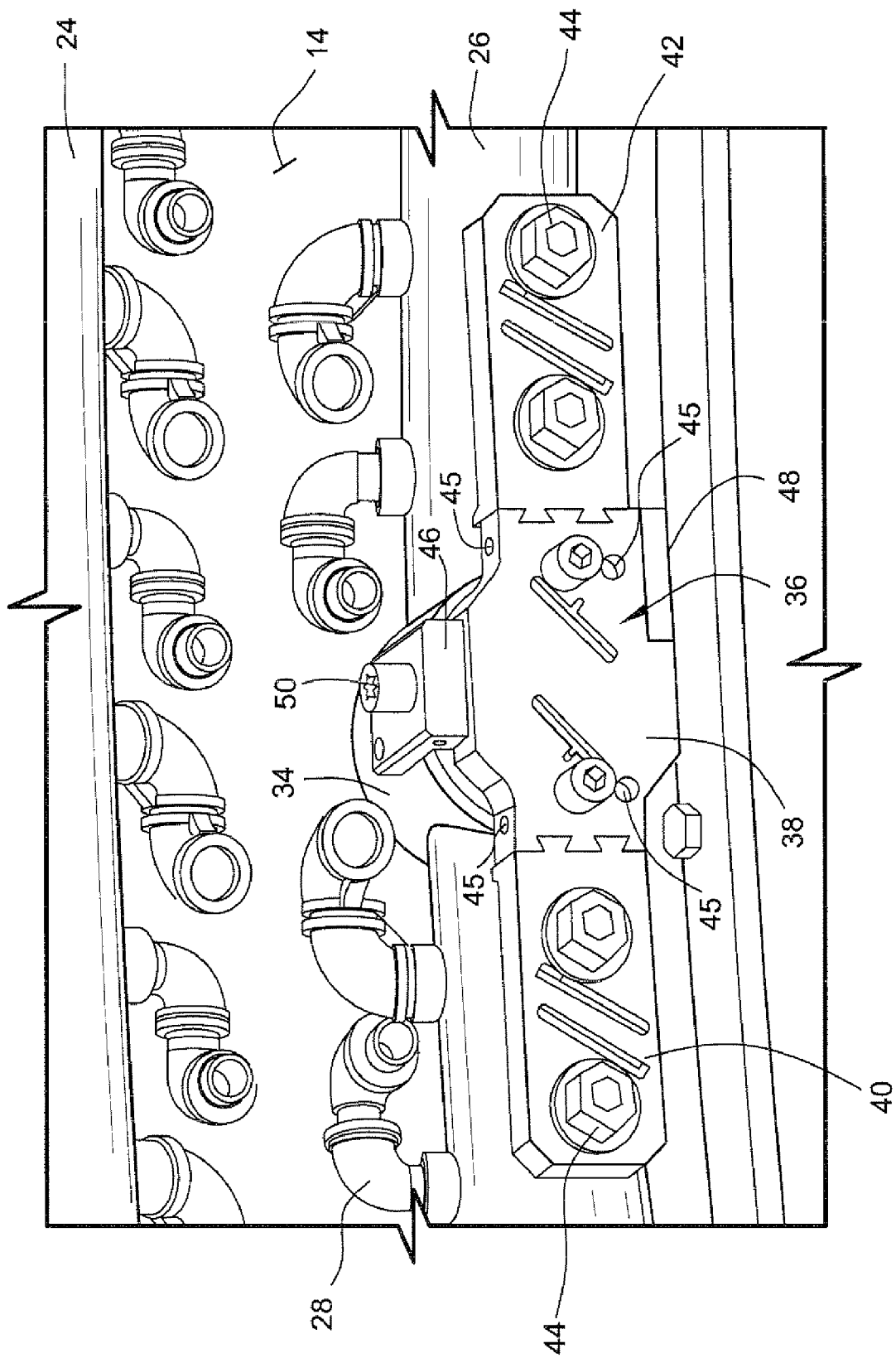
FIG. 3 is a perspective view of a T-box clamp assembly fastened to the T-box assembly in the RPV.

FIG. 3 is a perspective view of a core spray sparger T-box clamp assembly 36 that attaches to the sparger T-box and the opposite ends of sparger pipe 26. The clamp assembly reinforces the welds 32 between the opposite ends of sparger pipe 26, the cover plate 30 and the T-box 22. If cracks develop in the welds 32, the clamp assembly 36 holds the pipes, T-box and cover plate together, inhibits crack propagation and prevents or minimizes coolant water leakage.

The core spray sparger T-box clamp assembly 36 includes an anchor plate 38, a first clamp block 40 and a second clamp block 42. The anchor plate 38 is between the clamp blocks 40, 42, and positioned in front of the cover plate 30 of the T-box. The blocks 40, 42 connect to opposite sides of the anchor plate. Dove-tail joints between the clamp blocks 40, 42 and the anchor plate 38 secure the blocks to the anchor plate and permit the clamp blocks to slide relative to the anchor plate. The clamp blocks may be slid back on the anchor plate, such that the blocks and their T-bolts 74 (FIG. 4) are retracted away from the T-box and sparger pipes as the assembly is fitted onto the T-box. Once the anchor plate is secured to the T-box, the T-bolt nuts are rotated which brings the sealing collar 76 to bear against the curved surface of the sparger pipe and moves clamp blocks 40, 42 into a parallel alignment with the anchor plate.

The clamp blocks 40, 42 are attached to the sparger pipes by T-bolts 74 (FIG. 4) and T-bolt nuts 44. The T-bolts extend through apertures 80 (FIG. 8) in the sparger pipe 26. A threaded end of each bolt projects through an aperture in the clamp blocks 40, 42. The sealing collar 76 that interfaces with the sparger pipe prevents water leakage around the bolt. The T-bolt nuts 44 screw onto the threaded T-bolts and secure the clamp blocks to the pipes. The head of the bolt has a racetrack shape to slide into a corresponding slot aperture 80 in the pipe. The bolt is turned 90 degrees to be locked in the pipe. A sealing collar 76 is inserted on the bolt shaft and the shaft is inserted into a smooth bore hole 78 in the clamp block. A recess in the front face of the block is coaxial with the bolt hole and provides a seat for the T-bolt nut 44. A coaxial recess is also provided in the back face of the block to provide a seat for the sealing collar. The bottoms of both coaxial recesses have a semispherical shape to accommodate small amounts of articulation by the T-bolt and sealing collar as they interface with the sparger pipe. Ratchet springs 80 prevent the nuts from turning and fit into slots on the front of the clamp blocks 40, 42. The clamp blocks and a similar anchor plate are described in US Published Patent Application 2006/0082139 A1, which is commonly owned with this application and incorporated by reference herein in its entirety.

Figure 4:
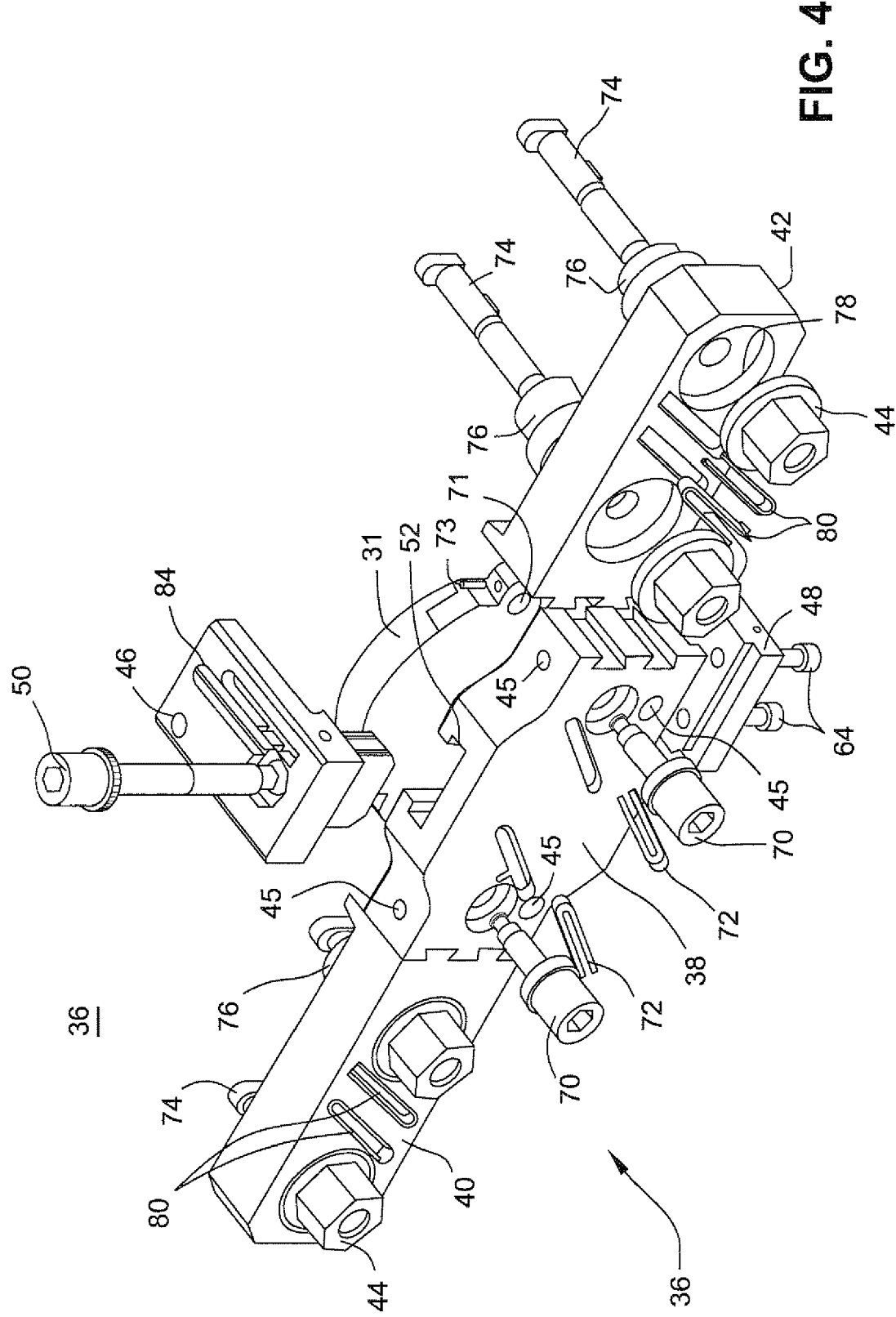
FIG. 4 is an exploded, front perspective view of the clamp assembly.
Figure 5:
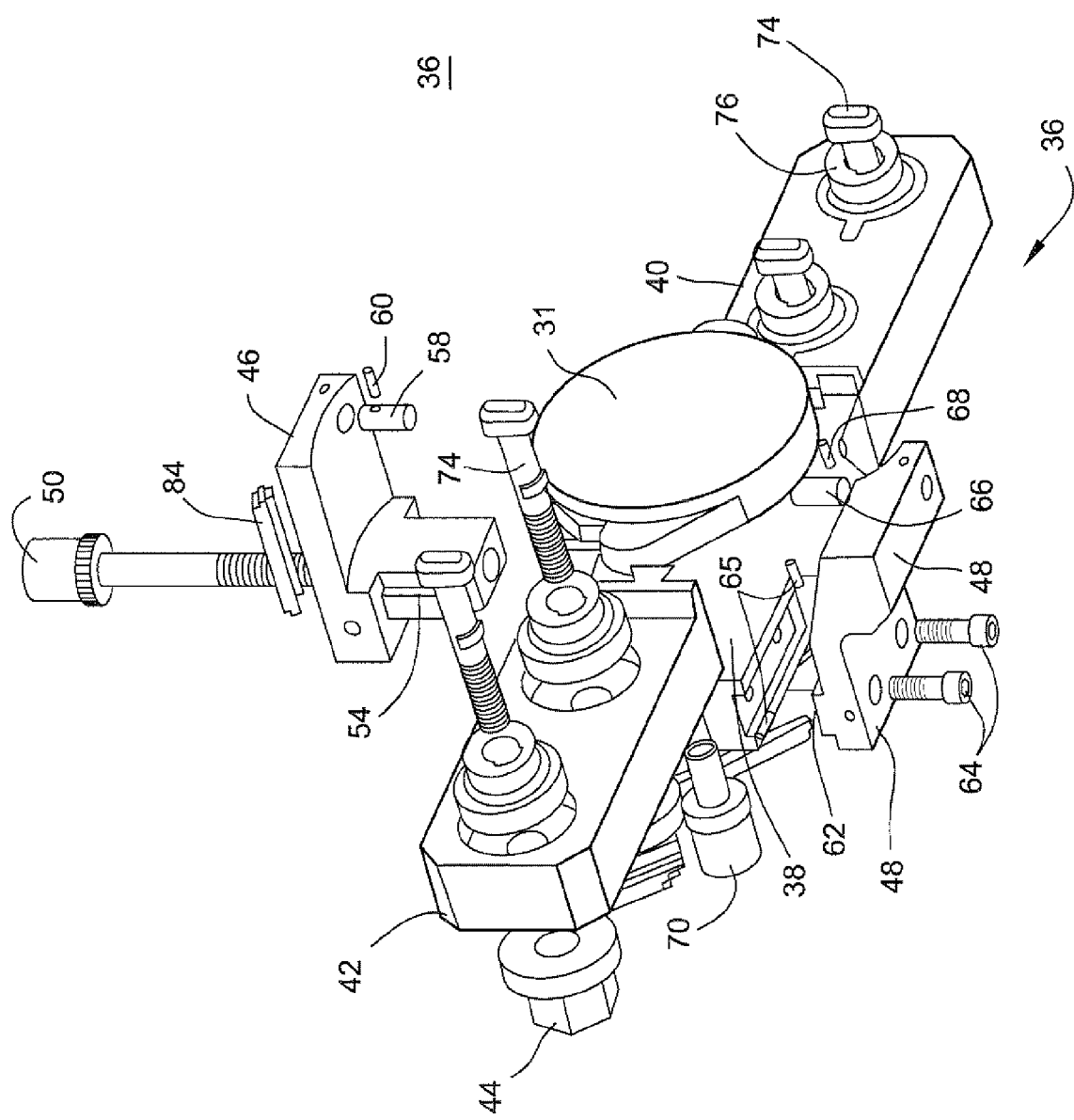
FIG. 5 is an exploded, rear perspective view of the clamp assembly.

FIG. 4 is an exploded view of the core spray sparger clamp assembly 36 showing a front and top view of the clamp. FIG. 5 is an exploded view of the core spray sparger clamp assembly 36 showing a rear and bottom view of the clamp.

The anchor plate 38 is secured to the T-box sidewall by a carrier plate 46 and the saddle bracket 48. The anchor plate is positioned in front of the T-box and biases a bearing plate 31 against the cover plate 30 of the T-box.

Before being placed in a RPV, the anchor plate 38 is assembled with a clamp block assembly. The clamp block assembly is comprised of the clamp blocks, T-bolts, sealing collars, T-bolt nuts and retaining springs. During this initial assembly the clamp blocks may be shifted back with respect to the anchor plate and the T-bolts are rotated 90 degrees and retracted into the blocks (until they bear against the inside surface of the sparger pipes). The saddle bracket 48 (FIG. 4) is attached to a bottom of the anchor plate and the carrier plate may be loosely attached to the top of the anchor plate with a carrier bolt 50. The assembly 36 of the anchor plate, clamp blocks and saddle bracket (and optionally the carrier bracket) is lowered into the water of the reactor and moved over the T-box. A lifting tool may be secured to engage lifting apertures 45 in the anchor plate so that the assembly 36 may be lowered into the RPV and fitted over the T-box and sparger pipes. Once the assembly 36 is secured to the T-box, the lifting tool may be removed by releasing the attachment to the lifting apertures 45.

The bearing plate is biased against the cover plate and secures the cover plate in the event of cracks in the weld between the cover plate and T-box. The bearing plate 31 is connected to the anchor plate 38 by bearing plate bolts 70 that extend through threaded holes in the anchor plate and are rotatably coupled to recesses 71 in the front face of the bearing plate 31. The front nose of the bolts 70 include a necked down region that fits into the recesses 71 and are secured in the recesses by dowels 73. The dowels 73 fit in apertures in the anchor plate and latch the nose of the bearing bolts in the bearing plate. The bearing bolts rotate to move the bearing plate towards the T-box cover plate. A latch spring 72 may lock the rotational position of each bearing plate bolt to ensure that the force applied to the cover plate by the bearing plate does not lessen over a prolonged operational period of the RPV. The latch springs may each seat in a respective slot on the face of the anchor plate 38.

Figure 6:
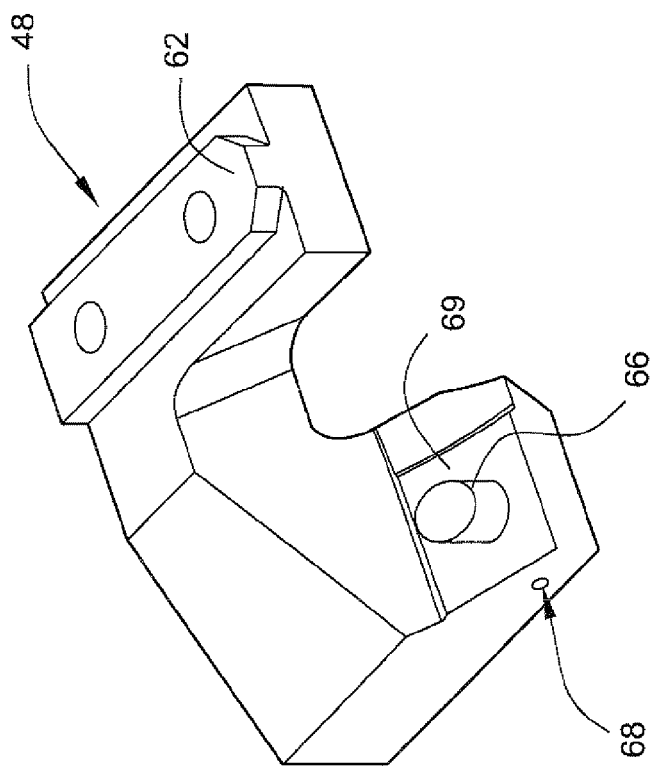
FIG. 6 is a perspective view of a saddle bracket.

FIG. 6 is a perspective view of the saddle bracket 48. The saddle bracket 48 has a tongue 62 that fits into a slot in the bottom of the anchor plate 38. The tongue and slot of the saddle bracket may extend entirely or partially the width of the saddle bracket and bottom edge of anchor plate, e.g., one-half the width of the saddle bracket. Cap screws 64 extend through holes in the saddle bracket and into threaded holes in the slot on the bottom of the anchor plate. Dowell pins 65 insert into the saddle bracket to lock the cap screws in place. The cap screws attach the saddle bracket to the anchor plate before the clamp assembly 36 is placed in the RPV.

The saddle bracket includes a vertically upright locating pin 66 that is secured by a dowel 68. The metallic locating pin 66 is relatively thick and resistant to shear stress. The saddle bracket has an arch shaped upper surface 69 that conforms to and seats against a lower surface of the sidewall 34 of the T-box. As the saddle bracket (along with the anchor plate and the rest of the assembly 36) is moved vertically upward against the T-box, the pin 66 fits in an aperture 82 (FIG. 9) in the lower surface of the sidewall 34 of the T-box. The pin secures the T-box to the saddle bracket and the anchor plate.

Figure 7:
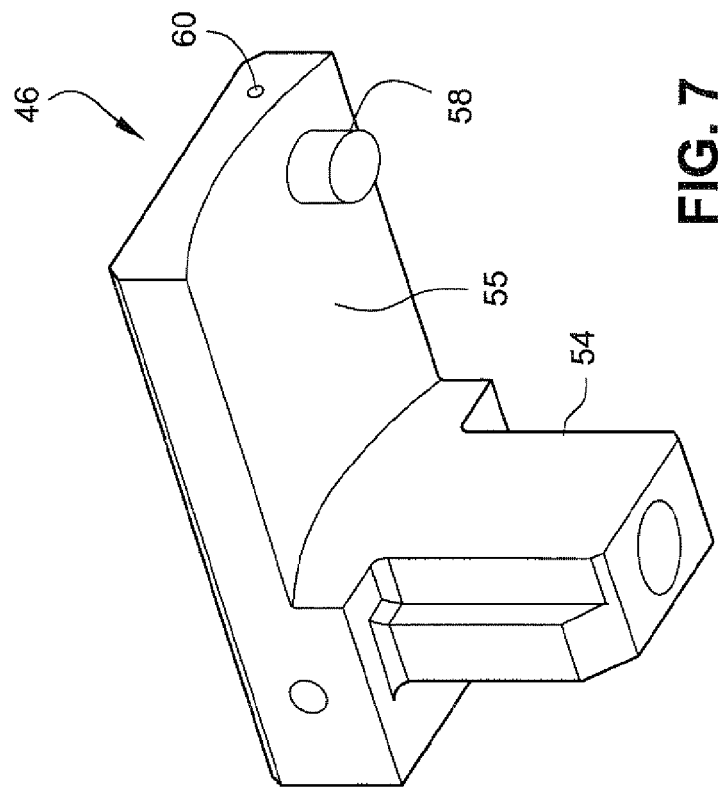
FIG. 7 is a perspective view of a carrier plate.

FIG. 7 is a perspective view of the carrier plate 46. The carrier plate is typically rigidly fixed to the anchor plate after the anchor plate and saddle bracket have been fitted to the front and bottom of the T-box. A tongue 54 on the carrier plate 46 slides downward into a slot 52 (FIG. 4) of the anchor plate 38. A carrier bolt 50 extends down through the carrier plate and screws into a corresponding threaded hole in the anchor plate at the bottom of the slot 52. The carrier bolt has a relatively long threaded section to allow the carrier plate to be shifted upwards with respect to the anchor plate as the clamp assembly 36 is positioned on and attached to the T-box. The carrier bolt is secured with a latch spring 84 that prevents the bolt from turning out of its threaded hole during prolonged operation of the RPV. The latch spring is seated in a slot on top of the carrier plate.

As the tongue 54 of the carrier plate moves into the anchor plate, the arc-shaped lower surface 55 on the carrier plate seats on an upper surface of the sidewall 34 of the T-box. A locating pin 58 extending vertically downward from the carrier plate fits in an aperture 82 (FIG. 8) on the upper surface of the T-box sidewall. The pin 58 secures the carrier plate (and the anchor plate) to the T-box. The pin is secured to the carrier plate by a dowel 60 that fits in hole in the carrier plate.

Figure 8:
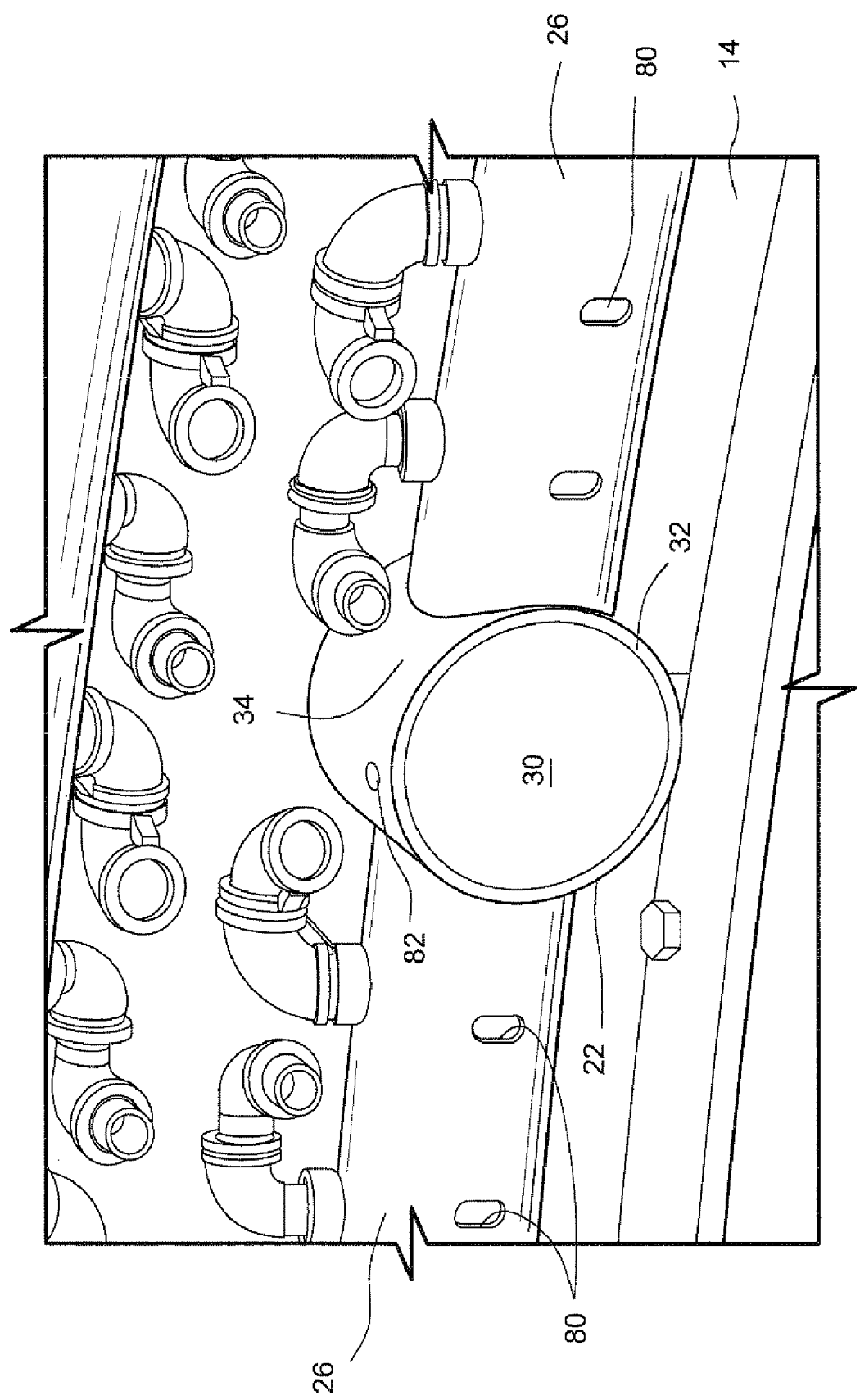
FIGS. 8 and 9 are perspective views of the sparger T-box and sparger piping showing modifications made for the clamp assembly.
Figure 9:
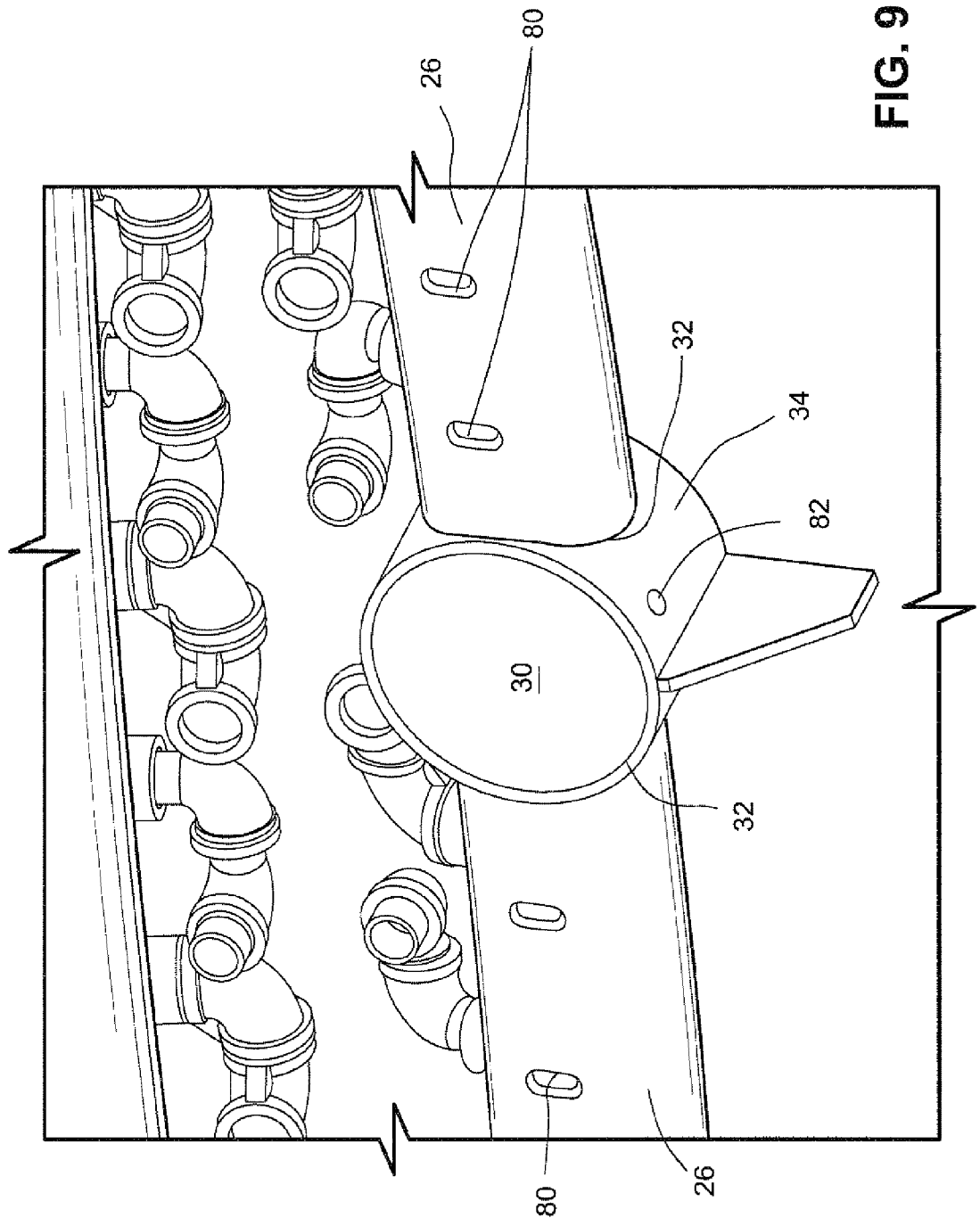

FIGS. 8 and 9 are perspective views of the inside of the shroud 14 and a T-box 22 and opposite ends of the sparger pipe 26 are modified to receive the core spray clamp assembly. FIG. 8 shows a top, front perspective view of the modifications needed to the T-box and sparger pipes to receive the clamp assembly, and FIG. 9 shows a bottom, front perspective view of the assembly. The modification to the sparger pipes include machining, e.g., electric discharge machining (EDM), slots 80 in the front surface of the pipes at locations near the T-box. The slots 80 in the pipes are to be aligned with the bolt holes in the clamp blocks 40, 42. The slots 80 in the pipes receive the racetrack shaped heads of the T-bolts which extend through the slots into the hollow interior of the pipe. After being inserted in the pipe, the bolt heads are rotated 90 degrees to bear on the inside surface of the sparger pipe. The modification to the T-box is to machine, e.g., EDM, upper and lower holes 82 in sidewall 34 of the T-box. The upper hole 82 in an upper surface of the sidewall receives, e.g., an clearance fit, the locating pin 58 for the carrier plate. A lower hole 82 on a bottom surface of the sidewall 34 receives the locating pin 66 of the saddle bracket.

Figure 10:
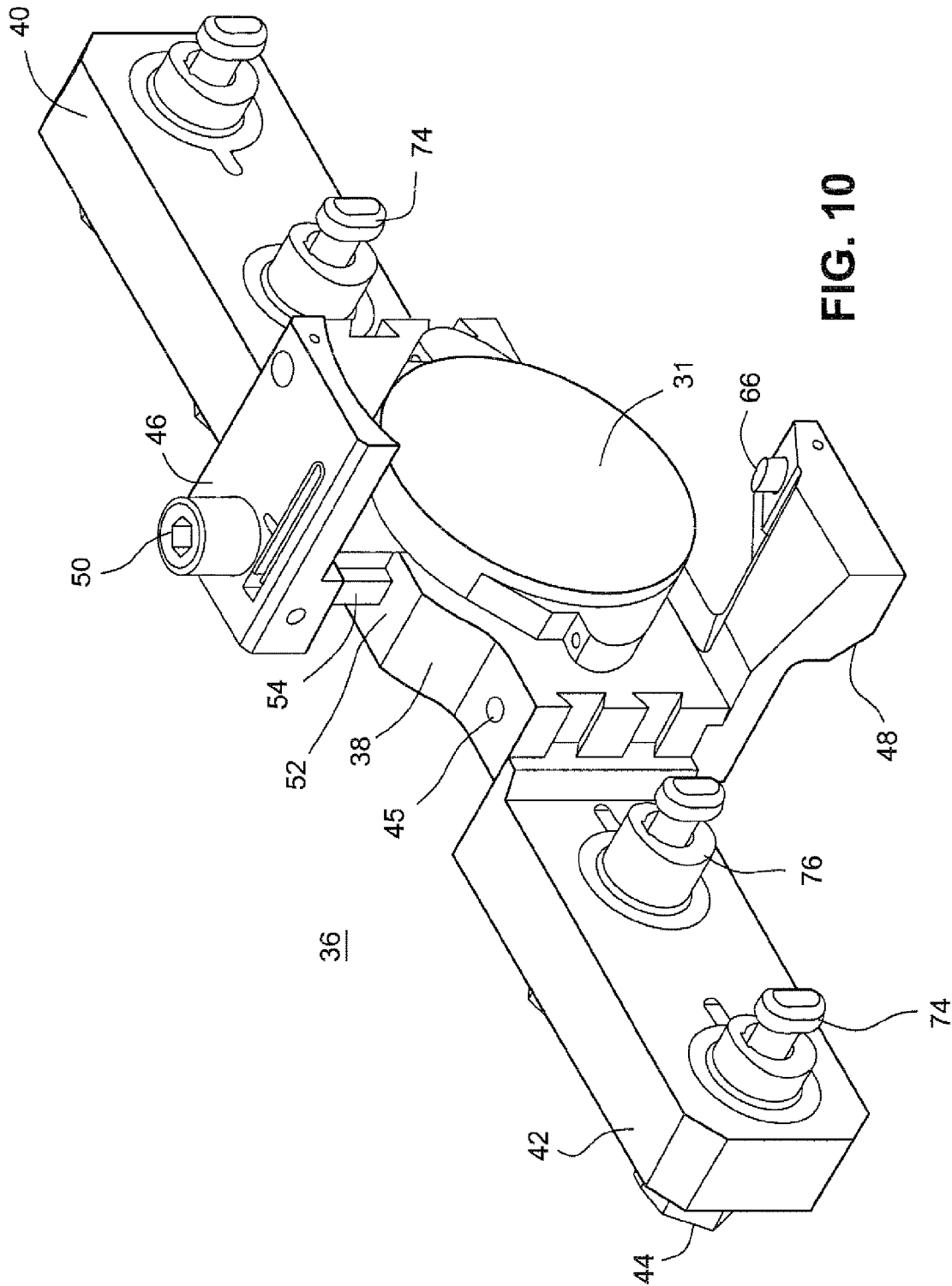
FIG. 10 is a perspective view of the clamp assembly ready to be inserted into a RPV.

FIG. 10 shows the clamp assembly 36 ready to be lowered into the RPV and fitted over a T-box. The clamp blocks 42, 44 are retracted with respect to the anchor plate 38 so that the ends of the T-bolts 74 will clear the sparger pipes as the assembly 36 is moved over the T-box. The saddle bracket 48 is secured to the bottom of the anchor plate. The carrier plate 46 is attached by the carrier bolt 50, but the carrier plate may be loosely attached (during installation) to the anchor plate so that the plate may be lowered, and is spaced upward to allow a clearance with respect to the sparger T-box. The tongue 54 of the carrier plate may or may not be partially inserted in the slot 52 of the anchor plate during installation of the anchor plate on the T-box.

Figure 11:
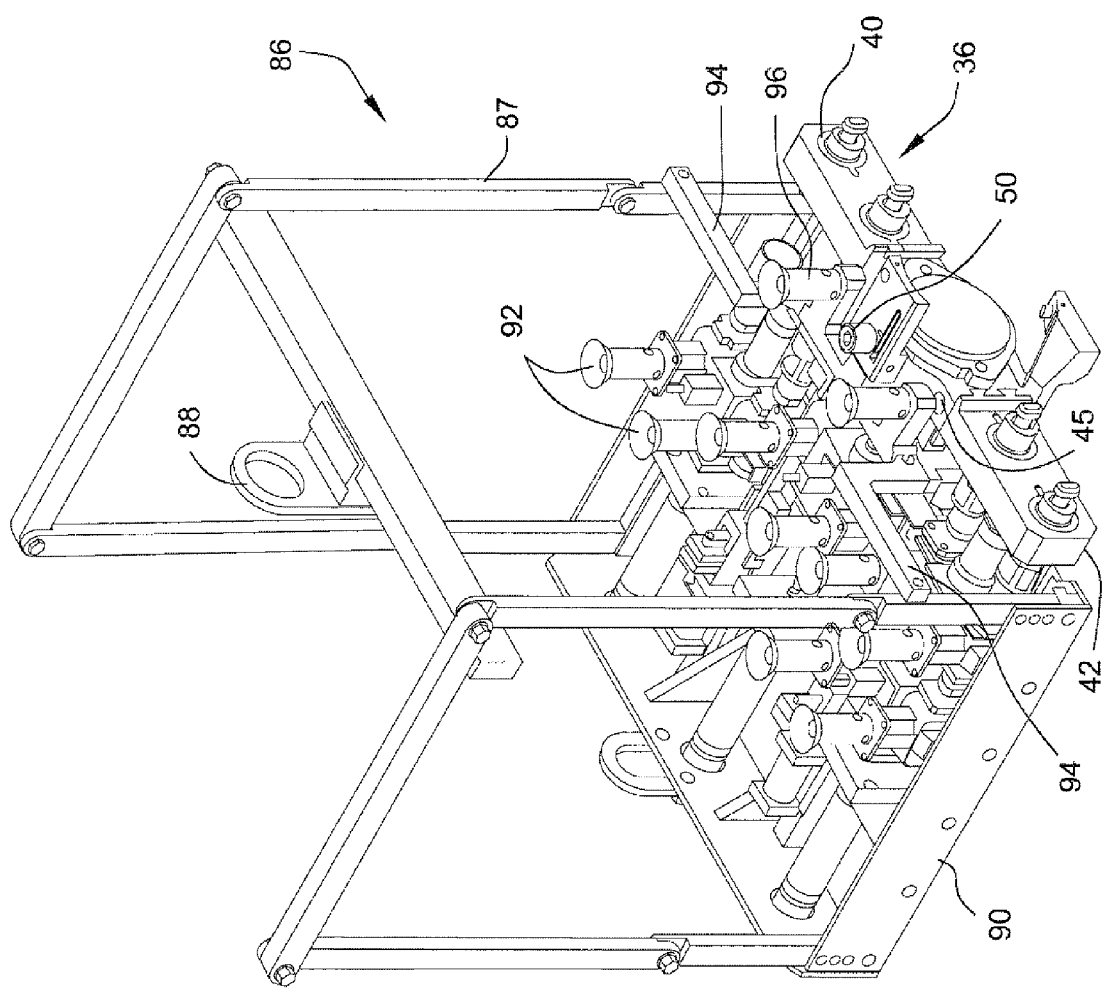
FIG. 11 is a perspective view of the clamping assembly on an installation tool.

FIG. 11 is a perspective view of the clamp assembly 36 loaded on an installation tool 86 which lowers the clamp assembly in the RPV and positions the assembly on the T-box. The lowering tool 86 has a rectangular frame 87 with a loading attachment 88 that is releasably connected to a crane that lowers the tool 86 and clamp assembly 36 in the RPV. The frame 87 includes a rectangular base 90 that supports gearing and tubular screw driver receivers 92 that are used to rotate the T-bolt nuts and bearing plate bolts. The clamp assembly 36 is attached to an installation bracket 94 on the front of the frame 87 that includes bolts that secure the clamp assembly to the tooling apertures 45 on the anchor plate. After the clamp assembly 36 is secured to the T-box, gearing and tubular screw driver receivers 96 release the bolts from the clamp assembly and allow the installation tool to be removed.

The clamp assembly 36 (with retracted clamp blocks and with the carrier plate spaced from the anchor plate) is lowered into the RPV by the lowering tool 86. The clamp assembly is positioned in front of and slightly below the T-box so that the pin 66 on the saddle bracket can clear the sidewall of the T-box. During clamp assembly installation, the bearing plate is in a retracted position, e.g., the bearing plate abuts the anchor plate, and by so doing is not yet in contact with the cover plate of the T-box. The clamp blocks 40, 42 are still in a retracted position so that the ends of the T-bolts 74 can pass over the sparger pipes as they are moved into alignment with the slots 80 in the pipes.

After being positioned in front of the T-box, the clamp assembly is moved towards the T-box until the locating pin 66 of the saddle bracket is aligned with the aperture 82 on the bottom of the sidewall of the T-box. The clamp assembly is shifted upwards to seat the saddle bracket surface 69 and the pin 66 on the T-box. The carrier bolt 50 is turned to lower the carrier plate into the anchor plate, and to seat the carrier plate or face 55 and the pin 58 on the upper portion of the sidewall of the T-box. The pin 58 of the carrier plate fits in aperture 82 of the T-box sidewall. The anchor plate is secured to the T-box by the clamping action of the carrier plate and saddle bracket and the pins that connect these plates to the sidewall of the T-box.

After the carrier plate and saddle bracket are latched by their respective locating pins to the T-box, the bearing plate bolts 70 are turned to advance the bearing plate 31 towards the cover plate 30. The bearing plate bolts are turned by corresponding gearing and tubular screw driver receivers 92 in the installation tool. The bearing plate bolts are turned to advance the bearing plate towards the cover plate of the T-box. The bearing plate secures the cover plate in the T-box, especially if cracks form in the weld between the cover plate and T-box.

The first and second clamp blocks 40, 42 are secured to sparger pipes by the T-bolts 74. The head of each bolt is race track shaped is inserted into a corresponding slot 80 in the sparger pipe. The T-bolt is secured to the sparger piping by rotating the T-bolt nuts. As the nuts rotate, the T-bolts rotate 90 degrees in concert with the nuts. A key feature on the T-bolt then interfaces with internal features in the bore of the sealing collar, which prevent further rotation of the T-bolt. Further rotation of the T-bolt nut pulls the head of the T-bolt into contact with the inside surface of the sparger pipe. This action also advances the clamp blocks 40, 42 into alignment with the anchor plate and cause the sealing collars to seal against the slots in the sparger pipes. Recesses in the front and back faces of the block are coaxial with the bolt hole and provide a seat for the T-bolt nut 44 and sealing collar 76. Ratchet springs 80 prevent the nuts from turning and fit into slots on the front of the clamp blocks 40, 42.

The sparger T-box clamp assembly 36 restrains the core spray sparger pipes and limits movement of these pipes relative to the position of the sparger T-box 22 in the event that the attaching welds 32 crack circumferentially. The saddle bracket 48 is attached to the anchor plate 38 by socket head cap screws 64 through a tongue and groove joint. This tongue and groove joint prevents shear loading of the cap screws. The carrier plate 46 interfaces with the anchor plate 38 through a T-slot, e.g, tongue on carrier plate and slot in anchor plate. The T-slot permits vertical relative motion between the carrier plate and anchor plate. The locating pin 58 is held captive in the carrier plate by a dowel pin 60, which is press-fit into the carrier plate. The preload imposed by the carrier bolt 50 provides a clamping force on the sparger T-box aligned with the cylindrical holes 82 in the sidewall of the T-box. The load path of this clamping force is applied through the saddle bracket 48 to the anchor plate and into the carrier bolt 50 and carrier plate 46. The carrier plate incorporates a latch spring 84 whose teeth ratchet on the opposing teeth of the carrier bolt. This action allows rotation of the carrier bolt only in the direction which increases mechanical preload in the carrier bolt. Latch springs 72 and ratchet springs 80 prevent loosening of the bearing plate bolts 70 and T-bolt nuts 44.

The above described core spray sparger T-box clamp assembly provides structural integrity to the sparger T-box and to hold together the welded joints of the T-box, cover plate and sparger pipes in the event that one or more welds should fail.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A core spray sparger T-box clamp for a sparger T-box in a shroud of a nuclear reactor pressure vessel, the sparger T-box clamp comprising:
   an anchor plate configured to be substantially aligned with a closed end of the T-box;
   a carrier plate slidably secured to an upper section of the anchor plate and configured to be latched to an upper side of the T-box, wherein the carrier plate extends horizontally from the anchor plate and the carrier plate includes a fastener extending downwardly and configured to be latched to the upper side of the T-box;
   a saddle bracket engaged with a lower section of the anchor plate and configured to be slidably engaged with a lower side of the T-box, wherein the saddle bracket extends horizontally from the anchor plate and the saddle bracket includes a fastener extending upwardly and configured to be latched to the lower side of the T-box and the saddle bracket is separated from the carrier plate by a distance greater than a distance between the upper side and the lower side of the T-box, and
   a pair of clamp blocks on opposite sides of the anchor plate, slidably secured to the anchor plate and each block configured to be fixed to a respective sparger pipe coupled to the T-box.

2. A core spray sparger T-box clamp as in claim 1 wherein the fastener of the carrier plate includes a first locating pin configured to extend into the upper side of the T-box and the fastener of the saddle bracket includes a second locating pin configured to extend into the lower side of the T-box, wherein the first pin is parallel to the second pin.

3. A core spray sparger T-box clamp as in claim 2 wherein the first locating pin and the second locating pin are vertical.

4. A core spray sparger T-box clamp as in claim 1 wherein the carrier plate further comprises a tongue adapted to slide into a slot in the anchor plate.

5. A core spray sparger T-box clamp as in claim 4 wherein the tongue is parallel to the fastener of the carrier plate.

6. A core spray sparger T-box clamp as in claim 1 wherein the carrier plate includes a horizontal arm having an arched lower surface conforming to an upper portion of a cylindrical sidewall of the T-box, wherein the cylindrical sidewall includes the upper side and the lower side of the T-box.

7. A core spray sparger T-box clamp as in claim 1 wherein the saddle bracket includes a horizontal plate having an arched upper surface conforming to a lower portion of a cylindrical sidewall of the T-box, wherein the cylindrical sidewall includes the upper side and the lower side of the T-box.

8. A core spray sparger T-box clamp as in claim 1 further comprising a bearing plate extendable from the anchor plate and configured to be biased against a cover plate of the T-box.

9. A core spray sparger T-box clamp as in claim 8 further comprising bearing bolts connecting the anchor plate to the bearing plate.

10. A core spray sparger T-box clamp as in claim 7 wherein the saddle bracket includes at least one cap screw extending through the bracket and into a threaded aperture in the anchor plate.

11. A core spray sparger T-box clamp for a sparger T-box in a shroud of a nuclear reactor pressure vessel, the sparger T-box clamp comprising:

an anchor plate configured to substantially align with a cover plate welded to an end of the T-box;

a bearing plate extendable horizontally from the anchor plate and configured to abut the end of the T-box;

a carrier plate slidably secured to an upper side of the anchor plate and configured to be latched to an upper region of a sidewall of the T-box, wherein the carrier plate extends horizontally from the anchor plate and wherein the carrier plate includes a latch extending towards the upper region and configured to latch to the upper region of the sidewall, and a saddle bracket attached to a lower side of the anchor plate, and said saddle bracket is configured to be latched to a lower region of the sidewall of the T-box, wherein the saddle bracket is parallel to the carrier plate and is separated from the carrier plate by a distance greater than a distance between the upper region and the lower region of the sidewall, and wherein the saddle bracket includes a latch extending towards the lower region and configured to latch to the lower region of the sidewall.

12. A core spray sparger T-box clamp as in claim 11 wherein the latch of the carrier plate is a first locating pin configured to extend into the upper region of the sidewall of the T-box and the latch of the saddle bracket is a second locating pin configured to extend into the lower region of the sidewall, wherein the first locating pin is parallel to the second locating pin.

13. A core spray sparger T-box clamp as in claim 11 wherein the saddle bracket includes an arc shaped surface conforming to a lower sidewall surface of the T-box.

14. A core spray sparger T-box clamp as in claim 1 further comprising a bearing plate bolt coupled to the bearing plate and extending through a threaded aperture in the anchor plate.

* * * * *